United States Patent
Grenga

(10) Patent No.: US 10,427,788 B1
(45) Date of Patent: Oct. 1, 2019

(54) AIRDROP PLATFORM INTEGRATED OUTRIGGER

(71) Applicant: U.S. Government as Represented by the Secretary of the Army, Natick, MA (US)

(72) Inventor: Todd M. Grenga, Cumberland, RI (US)

(73) Assignee: U.S. Government as Represented by the Secretary of the Army, Washington, DC (US)

( * ) Notice: Subject to any disclaimer, the term of this patent is extended or adjusted under 35 U.S.C. 154(b) by 373 days.

(21) Appl. No.: 15/353,793

(22) Filed: Nov. 17, 2016

(51) Int. Cl.
 *B64D 1/14* (2006.01)
 *B64D 1/10* (2006.01)

(52) U.S. Cl.
 CPC .................. *B64D 1/14* (2013.01); *B64D 1/10* (2013.01)

(58) Field of Classification Search
 CPC ... B64D 1/08; B64D 1/14; B64D 1/10; B65D 2519/00
 See application file for complete search history.

(56) References Cited

U.S. PATENT DOCUMENTS

| | | | | |
|---|---|---|---|---|
| 2,712,913 A * | 7/1955 | Stanley | ............... | B64D 1/14 188/266 |
| 5,039,036 A * | 8/1991 | Rogers | ............... | B64D 1/14 244/137.3 |
| 5,505,140 A * | 4/1996 | Wittmann | ............ | B65D 19/38 108/51.11 |
| 5,816,536 A | 10/1998 | Boullet | | |
| 6,070,832 A * | 6/2000 | Redd | ................... | B64D 1/12 14/71.1 |
| 6,105,511 A * | 8/2000 | Bridges | ............ | H05K 7/1488 108/55.1 |
| 6,158,691 A | 12/2000 | Menne et al. | | |
| 6,237,875 B1 | 5/2001 | Menne et al. | | |
| 6,712,317 B1 | 3/2004 | Warren et al. | | |
| 7,766,348 B2 * | 8/2010 | McFarland | ............ | A47F 5/11 108/52.1 |
| 8,864,080 B2 * | 10/2014 | Fox, Jr. | .............. | B64D 1/12 108/51.11 |
| 10,059,487 B2 * | 8/2018 | Sun | .................. | B65D 81/02 |
| 10,077,114 B2 * | 9/2018 | Jones | ................. | B64D 1/14 |
| 10,093,450 B2 * | 10/2018 | Embleton | ........... | B65D 19/42 |
| 2001/0050035 A1 * | 12/2001 | Mahnken | ............ | B64D 1/14 108/57.12 |
| 2004/0099187 A1 * | 5/2004 | Cox, Jr. | ............. | B65D 88/005 108/51.11 |
| 2011/0024569 A1 * | 2/2011 | Yandle | ............... | B64D 1/14 244/142 |
| 2011/0240800 A1 | 10/2011 | Fox, Jr. | | |
| 2012/0025027 A1 * | 2/2012 | Yandle | ............... | B64D 1/14 244/137.1 |
| 2014/0028037 A1 * | 1/2014 | Ness | .................. | B65D 19/00 294/68.1 |
| 2015/0069185 A1 | 3/2015 | Parkinson et al. | | |

* cited by examiner

*Primary Examiner* — Valentina Xavier
(74) *Attorney, Agent, or Firm* — Roger C. Phillips

(57) ABSTRACT

An airdrop platform is provided that includes a pallet. Under the pallet are a first outrigger main body and a second outrigger main body. The first outrigger main body and second main body each include at least one outrigger finger. When airdropped, the outrigger main bodies and outrigger fingers are configured to move from under the pallet.

2 Claims, 6 Drawing Sheets

AIRDROP PLATFORM INTEGRATED OUTRIGGER

STATEMENT OF GOVERNMENT INTEREST

The material described herein may be manufactured and used by or for the U.S. Government for governmental purposes without the payment of any royalties thereon or therefor.

FIELD OF THE DISCLOSURE

Embodiments of the present disclosure relate generally to aerial delivery systems and more particularly to airdrop devices that reduce tip-over and utilize less cargo space.

BACKGROUND

Airdropping is the method of delivering a payload (also referred to herein as "cargo") from an aircraft, still in flight, to the earth using parachutes as decelerators. Although parachutes are often used to slow decent of the payload to the ground, the payload can still be damaged upon impact with the ground. Upon impact, kinetic energy must be dissipated by a structure independent of the delivered equipment or that energy could impart damage that can possibly render the payload unusable. To protect the payload from ground impact, protective materials are strategically placed below the payload to help absorb impact.

Due to the height of energy dissipating materials required, some loads are at risk of rolling over after impact. Outriggers may be used as a means of preventing roll-over. When outriggers or other protective structures are placed on the top of the platform those structures can reduce the space available for critical cargo. The airplane cargo bay area limits the maximum height of the payload and material used to protect the payload. For example, when the payload rolls out of the cargo bay for the airdrop, as the center of gravity passes over the edge of the cargo bay ramp, the platform supporting the payload will start to teeter so that the front of the platform lifts up. Lifting up of the front of the platform can cause the payload to adversely interact with the aircraft.

SUMMARY

The present disclosure relates to airdrop devices that reduce tip-over and utilize less cargo space. In accordance with various embodiments, the airdrop device includes a pallet. Under the pallet are a first outrigger main body and a second outrigger main body. The first outrigger main body and second main body each include at least one outrigger finger. When airdropped, the outrigger main bodies and outrigger fingers are configured to move from under the pallet. In an embodiment, the outrigger main bodies and outrigger fingers swing downward from under the pallet and outward away from the pallet. In another embodiment, the outrigger main bodies and outrigger fingers move laterally outward from under the pallet.

BRIEF DESCRIPTION OF THE FIGURES

The accompanying figures, where like reference numerals refer to identical or functionally similar elements throughout the separate views, form part of the specification and illustrate embodiments in accordance with the included claims.

Figure 1:
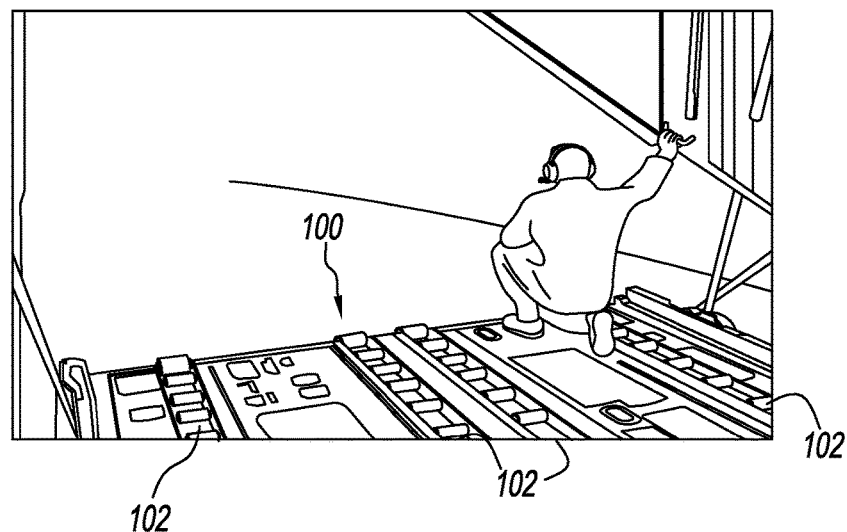
FIG. 1 shows an example aircraft cargo bay used in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present teachings. In addition, the description and drawings do not necessarily require the order presented. It will be further appreciated that certain actions and/or steps may be described or depicted in a particular order of occurrence while those skilled in the art will understand that such specificity with respect to sequence is not actually required.

The system components have been represented, where appropriate, by conventional symbols in the drawings, showing only those specific details that are pertinent to understanding the embodiments of the present teachings so as not to obscure the disclosure with details that will be readily apparent to those of ordinary skill in the art having the benefit of the description herein.

DETAILED DESCRIPTION

In the following description, numerous specific details are set forth to provide a more thorough understanding. As will be apparent to those skilled in the art, however, various changes using different configurations may be made without departing from the scope of the material described herein. In other instances, well-known features have not been described in order to avoid obscuring the material. Thus, the material is not considered limited to the particular illustrative embodiments shown in the specification and all such alternate embodiments are intended to be included in the scope of the appended claims.

There are many instances when cargo is air dropped from an aircraft. For example, the military and other organizations airdrop cargo when an airplane is unable to land, it is unsafe for an airplane to land and/or it is more efficient to airdrop the cargo.

Generally speaking, pursuant to various embodiments described herein, the present disclosure provides aerial delivery systems. More specifically, embodiments described herein are aerial delivery systems having airdrop devices that have outriggers under a pallet to occupy less cargo space, allow room for cargo and reduce the likelihood of tip-over. When the aerial delivery system is dropped from the plane, outriggers move from under the pallet to a fully "open" position. To absorb impact, compressible airbags are deployed and/or honeycomb cardboard is positioned below the cargo. When using airbags, the period of compression of the airbags upon impact can be controlled to ensure the delivered item experiences a low force loading. Following compression, controlled deflation gently lowers the aerial delivery system to ground level.

FIG. 1 shows an example aircraft cargo bay 100 used in accordance with some embodiments. The deck of the cargo bay 100 includes multiple rows of rollers 102. Rollers 102 allow movement of cargo into and out of the cargo bay 100 as well as inside the cargo bay 100. Examples of some models of aircraft that include roller trays are C-130 and C-17 aircrafts.

Figure 2:
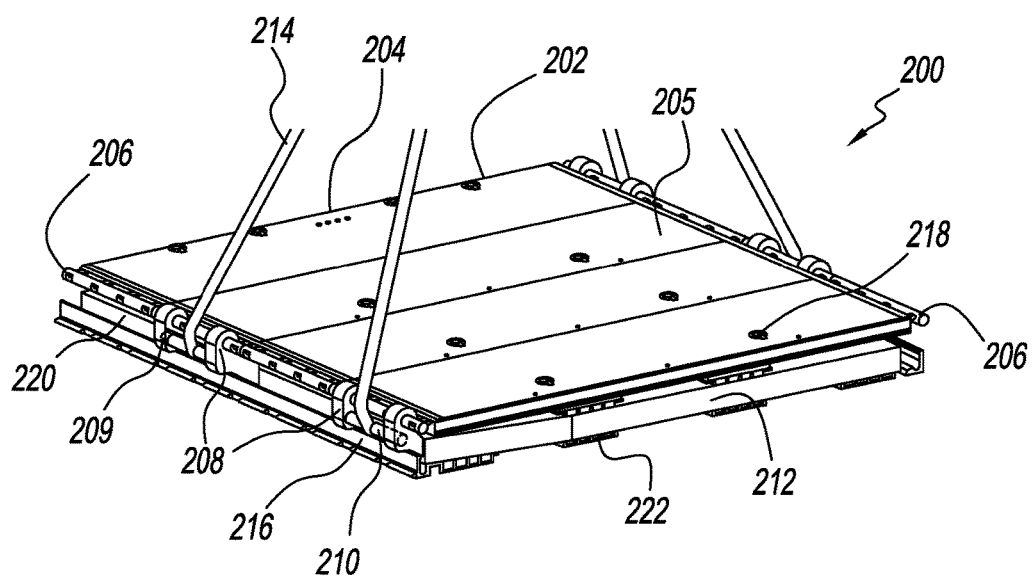
FIG. 2 shows a perspective view of an airdrop device having outriggers under a pallet, in accordance with some embodiments.

FIG. 2 shows a perspective view of an airdrop device 200 (also referred to herein as airdrop unit 200) having outriggers under a pallet, in accordance with some embodiments. The airdrop device 200 is depicted in a "closed" position. The airdrop device 200 includes a pallet 202. The pallet 202 includes at least one panel. Illustratively, the pallet 202 is depicted as being made up of a rear pallet panel 204 and several main pallet panels 205. FIG. 2 also depicts the main pallet panels 205 and rear pallet panel 204 as having a rectangular shape. However, in an embodiment the main pallet panels 205 have different dimensions than the dimensions of the rear pallet panel 204. In another embodiment, at least one of the main pallet panels 205 has different dimensions than the dimensions of the other main pallet panels 205.

The pallet 202 includes deck rings 218 that act as tie-down points that can be used to secure cargo to the airdrop device 200. Illustratively, FIG. 2 shows each of main pallet panels 205 as having two deck rings 218 and the rear pallet panel 204 as having four deck rings 218.

Under the pallet 202 are two main outrigger bodies 216 (also referred to herein as "outrigger assemblies 216"). Placing outriggers under the pallet 202 allows more space on top of the pallet 202. In FIG. 2, only one main outrigger body 216 is visible. Each outrigger main body 216 has at least one outrigger 212 (or "outrigger finger") connected to it and a side-rail 210. In FIG. 2, only outrigger 212 is visible. For illustrative purposes only, various embodiments are described herein that include each outrigger main body 216 having two outriggers. In an embodiment, one outrigger main body 216 has a different number of outriggers than the other outrigger main body 216. In an embodiment, at least one of the outriggers has different dimensions than another outrigger. In an embodiment, the length of each outrigger extends from the attached main outrigger main body 216 to the opposite main outrigger body 216.

The outrigger main body 216 includes a sidewall 220. The sidewall 220 has a plurality of outrigger hinge portions 208 and sling anchor points 209. The outrigger hinge portions 208 each include a bore that is adapted to receive a hinge pin 206 (also referred to herein as a "rod 206"). The outrigger hinge portions 208 allow the outrigger main body 216 and outriggers 212 to rotate about the hinge pin 206. Generally, rotation allows the outrigger main bodies 216 to swing downward from the pallet 202 and then outward from the pallet 202. Each outrigger 212 is connected to the other outriggers hinged to the same pallet 202 side by the outrigger hinge portions 208 and side-rail 210. Each side-rail 210 includes a set of detents for reception of aircraft cargo locks (not shown). A lower end of a strap 214 is connected to the outrigger main body 216 at the sling anchor points 209. The other end of each strap 214 is coupled to a parachute (not shown in the FIGs.). The straps 214 are also referred to herein as "suspension slings 214." The outriggers 212 also include roller pads 222 that, in conjunction with cargo bay deck rollers 102, allow movement of the airdrop device 200 in the cargo bay 100.

Figure 3:
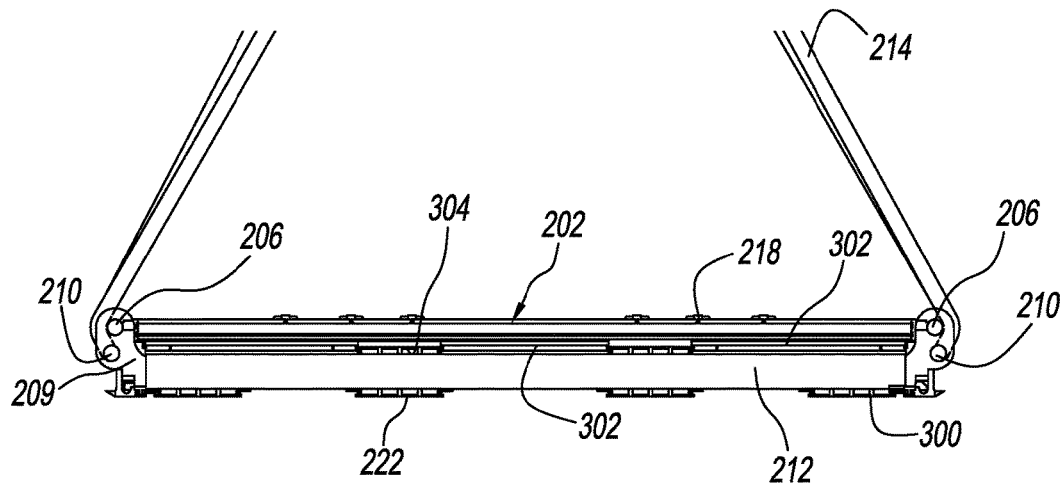
FIG. 3 shows a side view of the airdrop device depicted in FIG. 2, in accordance with some embodiments.

FIG. 3 shows a side view of the airdrop device 100 depicted in FIG. 2, in accordance with some embodiments. Each outrigger includes roller pads on its bottom surface and its top surface. For example, outrigger 212 includes a plurality of first surface outrigger roller pads 222 that in conjunction with the cargo bay deck rollers 102 allow movement of the airdrop device 200 in the cargo bay 100. The outrigger 212 also includes second surface outrigger roller pads 304. The second surface outrigger roller pads 304 provide a load path for the weight of the load to be transferred to the first surface outrigger roller pads 222. When the airdrop device 200 is in the closed position, the bottom surface of the pallet 202, second surface outrigger roller pads 304 and outrigger 212, form a cavity for a shock absorber assembly including, e.g., compressed/deflated airbags 302. Although not shown in FIG. 3, it is appreciated that other outriggers, first surface roller pads on the other outriggers and the bottom surface of the pallet 202 form cavities for other compressed/deflated airbags. FIG. 3 also shows one end of the straps/suspension slings 214 terminating at the sling anchor point 209. Suspension slings 214 may be anchored through the use of devises or shackles or the sling anchor point 209 may be designed to accept the closed loop end of the sling 214 directly.

Figure 4:
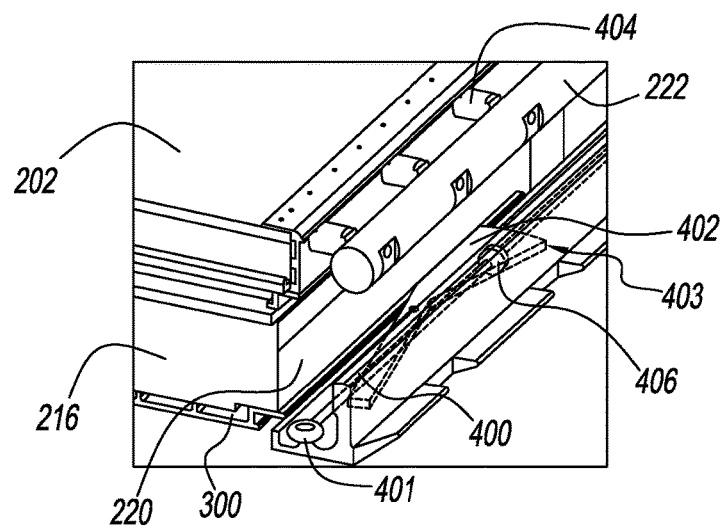
FIG. 4 shows a close-up view of a portion of the airdrop device depicted in FIG. 2, in accordance with some embodiments.

FIG. 4 shows a close-up view of a portion of the airdrop device 200, in accordance with some embodiments. Various mechanisms can be used to secure the airdrop device 200 in the closed position. FIG. 4 shows an example of a latch mechanism 403 (also referred to herein as a "locking mechanism 403") that can be used to secure the airdrop device 200 in the closed position. Although the airdrop device 200 can include multiple latch mechanisms 403 only one is depicted in the FIGs. The latch mechanism 403 includes a pull rod 400 and a rocker arm 402. One end of the rocker arm 402 is wider than the other. Rotation of the wider end of the rocker arm 402 towards the outrigger 212 causes the rocker arm 402 to enter a cavity (not shown) in the underside of the outrigger 212. The rocker arm 402 restrains the outrigger 212 under the panels 204, 205 until the wider end of the rocker arm 402 is rotated away from the outrigger 212. The side-rail 210 limits the amount of rotation of the rocker arm 402 into the cavity by limiting the narrower end of the rocker arm 402.

A pull rod 400 is shown with an optional end loop 401. Along the pull rod 400 adjacent to the rocker arm 402, is at least one collar 406 creating a bulge in the pull path. When in the closed position, the collar 406 is aligned with the wider end of the rocker arm 402. In an embodiment, a cable is used rather than pull rod 400.

In an embodiment, the wider end of the rocker arm 402 is forced against the outside of the sidewall 220 and does not enter a cavity in the underside of the outrigger 212. The rocker arm 402 is configured to act as a wedge against the sidewall 220 of the outrigger main body when the pull rod 400 is oriented such that the collar 406 is against the rocker arm 402. When the rocker arm 402 is wedged against the sidewall 220, the outrigger 212 is prevented from rotating to an "unlocked" position (also referred to herein as "unlatched"). When the airdrop device 200 is to be airdropped the pull rod 400 can be unlocked by pulling the pull rod 400 to remove the collar 406 from against the rocker arm 402.

The pull rod 400 can be deployed by a warfighter or other end-user pulling on the pull rod 400, from a parachute canopy opening, a securing tie to the aircraft floor, or other means. As the pull rod 400 moves from locked to unlocked, the collar 406 moves from the wide end to the narrow end of the rocker arm 402. This forces the rocker arm 402 to rotate out from below the outriggers 212.

Figure 5:
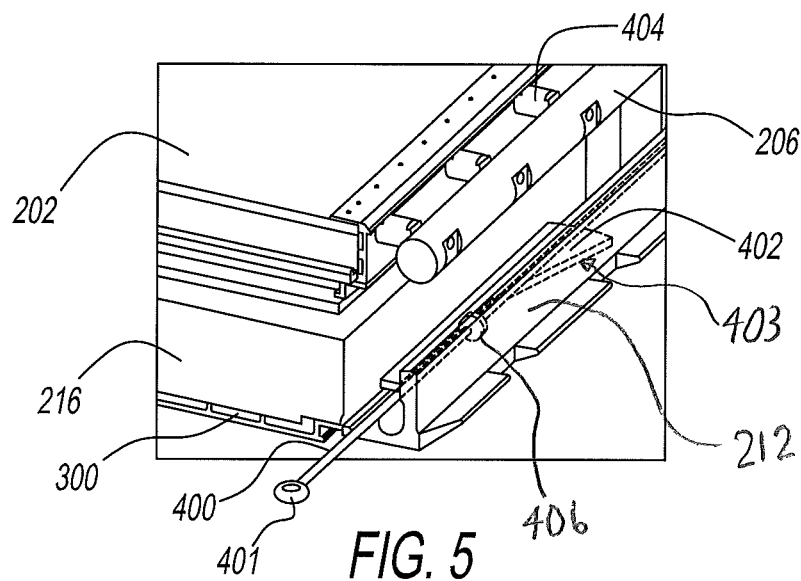
FIG. 5 shows another close-up view of a portion of the airdrop device depicted in FIG. 2, in accordance with some embodiments.

FIG. 5 shows a close-up perspective view of the locking mechanism 403 in the unlocked position. Specifically, the pull rod 400 is positioned so that the collar 406 is not against the rocker arm 402 allowing the rocker arm 402 to be rotated away from the sidewall 220. When the airdrop device 200 is airdropped the outrigger 212 is able to move as described below.

Figure 6:
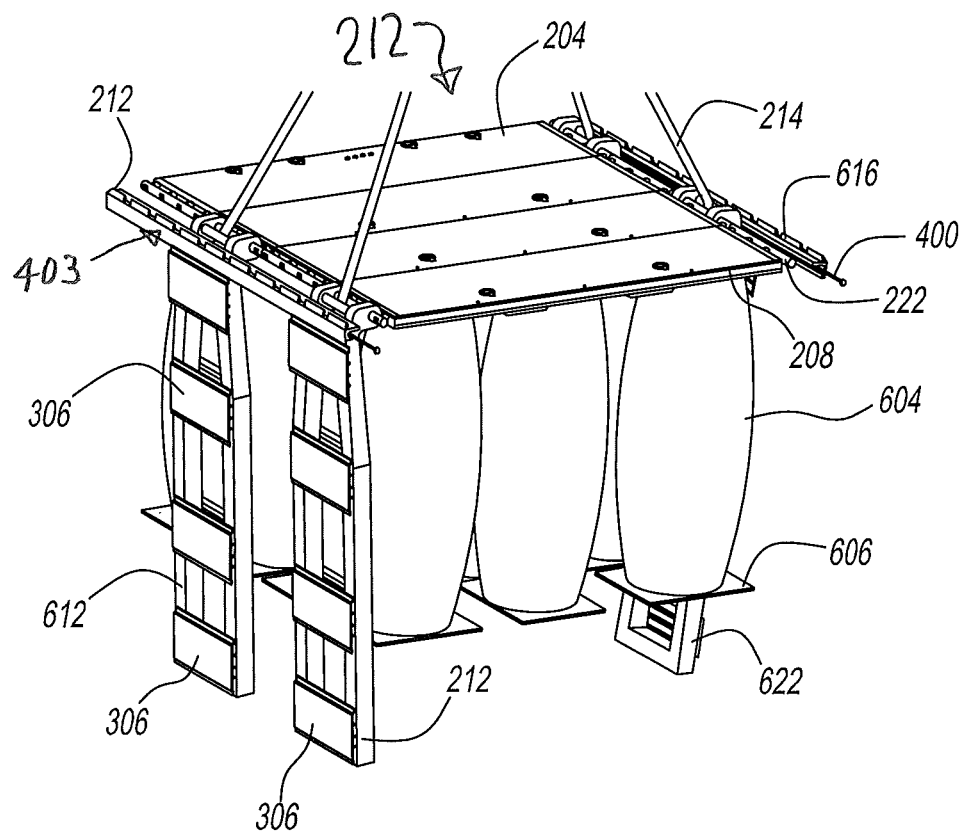
FIG. 6 shows a perspective view of the airdrop device having outriggers partially rotated, in accordance with some embodiments.

FIG. 6 shows a perspective view of the airdrop device 200 in a partially open position, in accordance with some embodiments. Before the airdrop, the outrigger main bodies and outriggers are at a starting reference angle. Illustratively, the starting reference angle is referred to herein as 0 degrees. After the locking mechanism 403 has been unlocked, the airdrop device 200 is airdropped. While descending towards earth, forces, such as for example gravity, allow the outrigger main bodies and the attached outriggers to rotate, about the hinge pin 206, downward and away from the pallet 202. In FIG. 6, when the airdrop device 200 is airdropped, gravity and the hinge pin 206 allow outrigger main body 212 and outrigger 612 including roller pads 306 to rotate clockwise, downward about 90 degrees away from the pallet 202. Gravity and hinge pin 206 allow outrigger main body 616 and outrigger 622 to rotate counter-clockwise, downward also about 90 degrees away from the pallet 202. While the outriggers main bodies 216 and 220 (and the attached outriggers) are rotating, the airbags 604 extend.

One end of each suspension slings 214 is connected to an anchor point on the outriggers and routed outboard of the hinge pin 206. The other end of each of the straps 214 is coupled to at least one parachute (not shown). Forces such as drag provided by the parachute pulls the straps 214 taught. Tension on the straps 214 causes the outrigger main bodies 216 and attached outriggers 212, 612, 622 to rotate further towards 180 degrees from the starting reference angle of 0 degrees.

Figure 7:
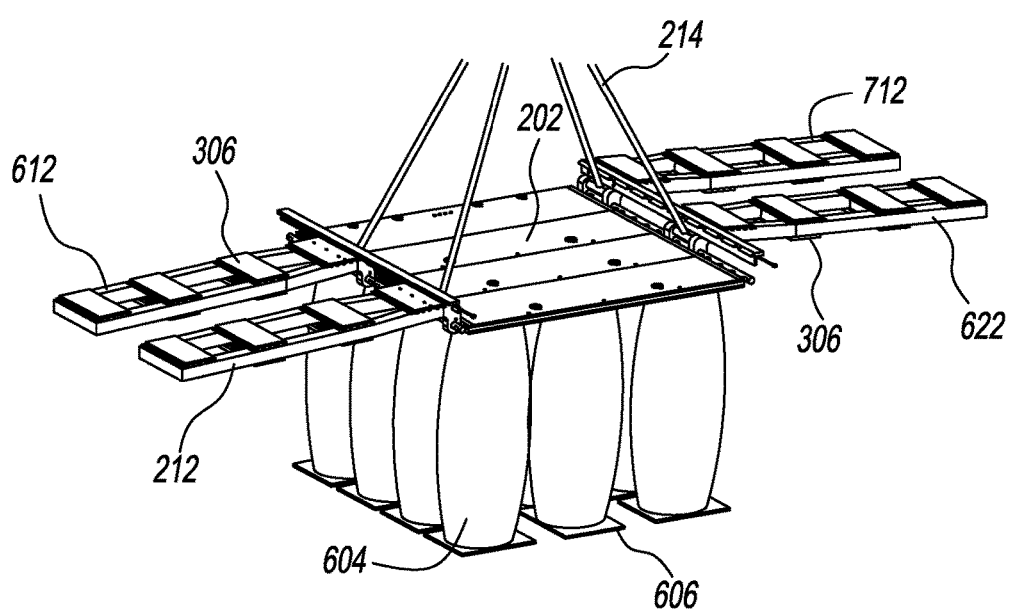
FIG. 7 shows a perspective view of the airdrop device having the outriggers fully rotated, in accordance with some embodiments.

The FIG. 7 shows a perspective view of the airdrop device 200 having the outriggers 212, 612, 622, and 712 fully rotated, in accordance with some embodiments. "Fully rotated" or "full rotation" is defined herein as moving or turning outriggers around the hinge pin 206 until the outriggers are from under the pallet 202 and are parallel to or substantially parallel to the pallet 202. In FIG. 7, tension on the straps 214 from parachute drag pulls the outrigger main bodies 216, 616 causing the outriggers 212, 612, 622, and 712 to rotate towards a full rotation position.

Figure 8:
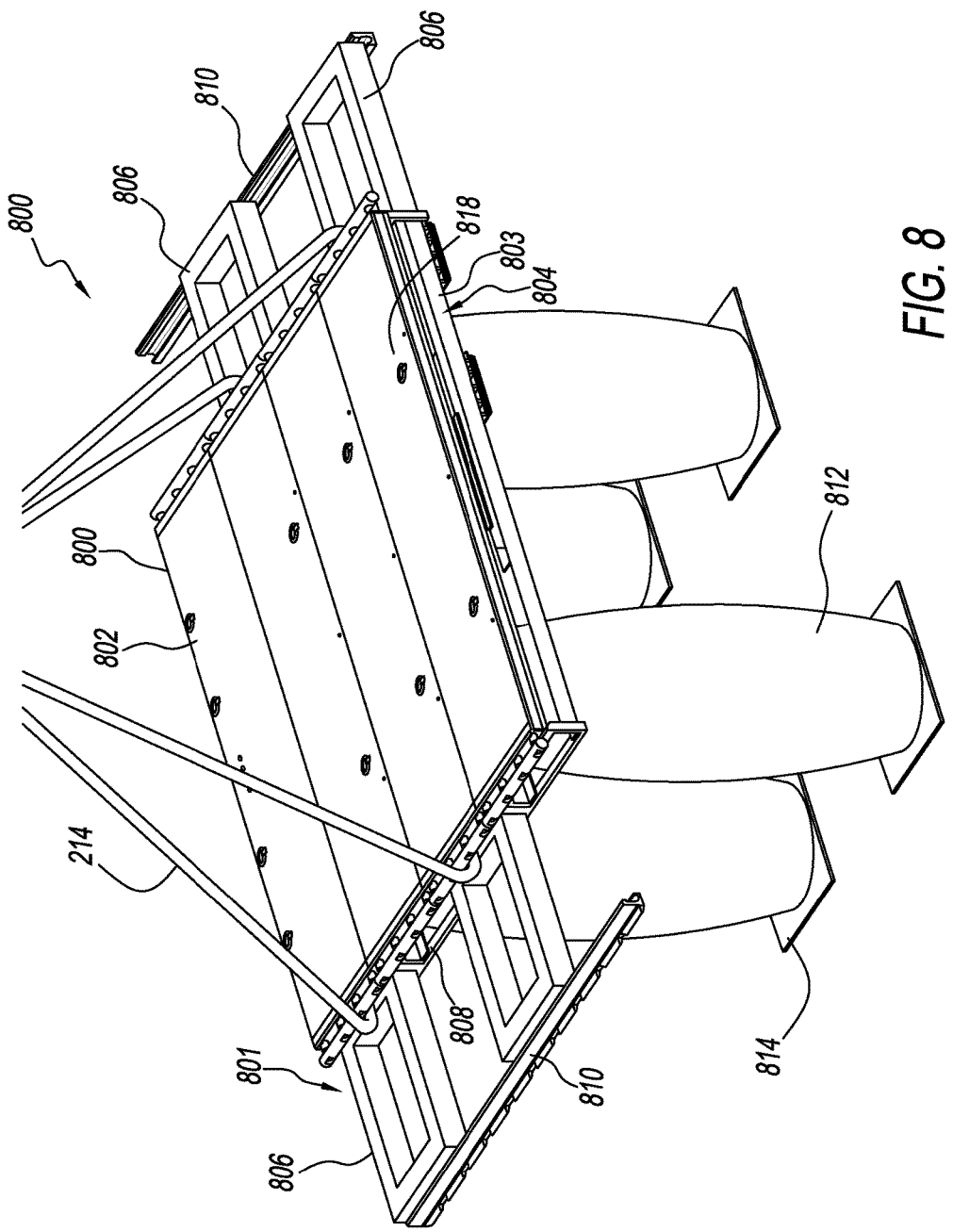
FIG. 8 shows a perspective view of an airdrop device having outriggers that are moved laterally so that the outriggers are partially extended from under a pallet, in accordance with some embodiments.

FIG. 8 shows a perspective view of an airdrop device 800. The airdrop device 800 includes a pallet 802. In an embodiment, the pallet 802 is made of multiple panels 818. Under the pallet 802 are two outriggers 801. For illustrative purposes only, FIG. 8 depicts each of the outriggers 801 as including two outrigger fingers 806. The outrigger fingers 806 on each respective outrigger 801 are connected on one end by a sidewall 810. It is appreciated that in another embodiment, either (or both) outrigger 801 includes a number of outrigger fingers 806 other than two.

Figure 9:
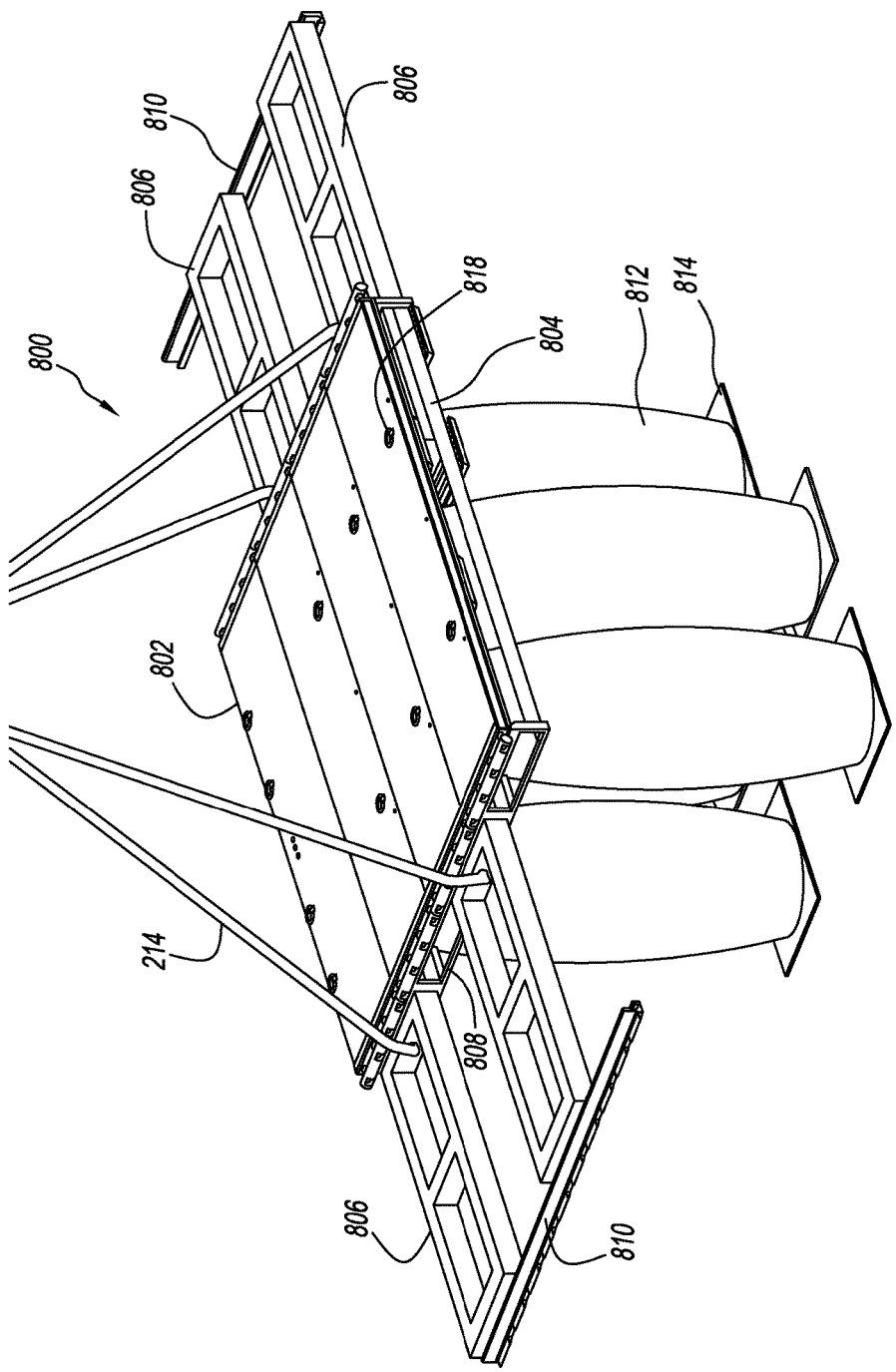
FIG. 9 shows a perspective view of an airdrop device having the outriggers moved laterally so that the outriggers are fully extended from under the pallet, in accordance with some embodiments.

Secured under the pallet 802 is a bracket 808. Also under the pallet 802 is a slide track assembly 804. The slide track assembly 804 includes outer rails 803 secured to the bracket 808 and an inner rails (not shown) secured to the outrigger fingers 806. The bracket 808, the outer rails 804 and the inner rails form tracks that allow the outrigger fingers 806 to move laterally, from under the pallet 802, along the path provided by the tracks. Various locking/latching mechanisms can be used to secure the outriggers 801 under the pallet 802 until the airdrop device 800 is deployed. When the airdrop device 800 is deployed, the outriggers 801 and outrigger fingers 806 move laterally and away from the pallet 802 in response to tensioning of the slings or straps 214. FIG. 8 shows the outrigger fingers 806 as having moved partially from under the pallet 802. When the outriggers 801 and outrigger fingers 806 move from under the pallet 802, airbags 812 under the pallet 802 deploy. The airbags 812 include a protective footing 814 that protects the bottom surface of the airbag 812. In an embodiment, the brackets 808 include a slot configured to receive the outrigger fingers 806 and allow the outrigger fingers 806 to move along the slot. FIG. 9 shows a perspective view of the airdrop device 800 having outriggers 801 and outrigger fingers 806 fully extended away from the airdrop device 800.

While the foregoing is directed to embodiments of the present invention, other and further embodiments of the invention may be devised without departing from the basic scope thereof, and the scope thereof is determined by the claims that follow.

I claim:

1. A device for air dropping cargo from an airplane, comprising:
   a pallet;
   a first outrigger main body that is coupled to the pallet;
   at least one outrigger finger connected to the first outrigger main body,
   wherein the first outrigger main body and the at least one outrigger finger form a first outrigger,
   wherein the first outrigger includes a first plurality of sling anchor points;
   a second outrigger main body that is coupled to the pallet;
   at least one other outrigger finger connected to the second outrigger main body,
   wherein the second outrigger main body and the at least one other outrigger finger form a second outrigger,
   wherein the second outrigger includes a second plurality of sling anchor points,
   a shock absorbing assembly coupled to the pallet;
   a first rod coupled to a first end of the pallet;
   a second rod coupled to a second end of the pallet;
   a first plurality of hinges coupled to the first end of the pallet,
   wherein each hinge in the first plurality of hinges includes a bore adapted to receive the first rod;
   a second plurality of hinges coupled to the first outrigger,
   wherein each hinge in the second plurality of hinges includes a bore adapted to receive the first rod;
   a first set of side-rails connecting each hinge in the first plurality of hinges to a respective hinge in the second plurality of hinges;
   a third plurality of hinges coupled to the second end of the pallet,
   wherein each hinge in the third plurality of hinges includes a bore adapted to receive the second rod;
   a fourth plurality of hinges coupled to the second outrigger,
   wherein each hinge in the fourth plurality of hinges includes a bore adapted to receive the second rod;

a second set of side-rails connecting each hinge in the third plurality of hinges to a respective hinge in the fourth plurality of hinges;

wherein the first outrigger is configured to pivot clock wise about the first rod and the second outrigger is configured to pivot counter-clock wise about the second rod;

wherein the first plurality of sling anchor points is adapted to receive a first set of suspension lines and the second plurality of sling anchor points is adapted to receive a second set of suspension lines;

a plurality of pallet roller pads on a bottom surface of the pallet;

a plurality of outrigger roller pads configured to engage a correspondingly configured aircraft cargo bay, the outrigger roller pads being attached to the first outrigger and the second outrigger, wherein the plurality of outrigger roller pads, the first outrigger, the second outrigger, the plurality of pallet roller pads, and the pallet form cavities adapted to receive the shock absorbing assembly.

2. The device of claim 1 wherein the shock absorbing assembly comprises compressed airbags.

\* \* \* \* \*